US012779854B2

(12) United States Patent
Tojo

(10) Patent No.: US 12,779,854 B2
(45) Date of Patent: Nov. 3, 2026

(54) LIQUID EJECTION DEVICE AND CONTROL METHOD OF LIQUID EJECTION DEVICE

(71) Applicant: SEIKO EPSON CORPORATION, Tokyo (JP)

(72) Inventor: Seiji Tojo, Shiojiri (JP)

(73) Assignee: SEIKO EPSON CORPORATION, Tokyo (JP)

(*) Notice: Subject to any disclaimer, the term of this patent is extended or adjusted under 35 U.S.C. 154(b) by 154 days.

(21) Appl. No.: 18/770,724

(22) Filed: Jul. 12, 2024

(65) Prior Publication Data

US 2025/0018716 A1 Jan. 16, 2025

(30) Foreign Application Priority Data

Jul. 12, 2023 (JP) ................................ 2023-114318

(51) Int. Cl.
*B41J 2/165* (2006.01)
*B41J 2/155* (2006.01)

(52) U.S. Cl.
CPC ............. *B41J 2/1652* (2013.01); *B41J 2/155* (2013.01); *B41J 2002/16573* (2013.01)

(58) Field of Classification Search
CPC ...................... B41J 2/1652; B41J 2/155; B41J 2002/16573; B41J 2/16526
See application file for complete search history.

(56) References Cited

U.S. PATENT DOCUMENTS

2011/0050765 A1* 3/2011 Nishida ................ B41J 2/16526 347/6

FOREIGN PATENT DOCUMENTS

JP 2011088308 A 5/2011

* cited by examiner

*Primary Examiner* — Lisa Solomon
(74) *Attorney, Agent, or Firm* — CHIP LAW GROUP

(57) ABSTRACT

A liquid ejection device includes a liquid ejection head that performs printing by ejecting liquid from a plurality of nozzles in an ejection direction, which intersects a vertical direction, from a plurality of nozzles onto a transported medium and a control section configured to control the liquid ejection head, wherein the liquid has a pigment component, the liquid ejection head is provided with a nozzle row in which a plurality of the nozzles is arranged in parallel, and the control section performs flushing which is ejection of the liquid not related to the printing from the plurality of nozzles with an ejection amount based on a height difference of the plurality of nozzles.

14 Claims, 5 Drawing Sheets

LIQUID EJECTION DEVICE AND CONTROL METHOD OF LIQUID EJECTION DEVICE

The present application is based on, and claims priority from JP Application Serial Number 2023-114318, filed Jul. 12, 2023, the disclosure of which is hereby incorporated by reference herein in its entirety.

BACKGROUND

1. Technical Field

The present disclosure relates to a liquid ejection device such as a printer and a control method of the liquid ejection device.

2. Related Art

For example, as in JP-A 2011-88308, there is a liquid ejection device which is an example of a liquid ejection device which performs printing by ejecting ink which is an example of liquid from a head which is an example of a liquid ejection head. The head includes a nozzle forming surface. A nozzle row in which a plurality of nozzles is arranged is provided on the nozzle forming surface. The head is installed such that the nozzle forming surface is inclined with respect to a horizontal plane.

In a liquid containing a pigment component, the concentration of the pigment component may be biased due to sedimentation of the pigment component. When sedimentation occurs in a liquid ejection head having a height difference in a nozzle row, a nozzle at a high position ejects a liquid having a low concentration, whereas a nozzle at a low position ejects a liquid having a high concentration. As a result, unevenness occurs in the printed matter. The unevenness of the printed matter can be reduced by performing flushing or the like before printing to discharge the liquid in which the concentration is biased. However, a large amount of liquid is consumed, when all of the liquid having a biased concentration is discharged.

SUMMARY

According to an aspect of the disclosure, a liquid ejection device includes a liquid ejection head that performs printing by ejecting liquid from a plurality of nozzles in an ejection direction, which intersects a vertical direction, from a plurality of nozzles onto a transported medium and a control section configured to control the liquid ejection head, wherein the liquid has a pigment component, the liquid ejection head is provided with a nozzle row in which a plurality of the nozzles is arranged in parallel, and the control section performs flushing, which is ejection of the liquid not related to printing, from the plurality of nozzles with an ejection amount based on a height difference of the plurality of nozzles.

A control method of the liquid ejection device including a liquid ejection head that performs printing by ejecting liquid from a plurality of nozzles in an ejection direction, which intersects a vertical direction, from a plurality of nozzles onto a transported medium, the liquid including pigment component, and the liquid ejection head including a nozzle row configured by arranging a plurality of the nozzles in parallel, the control method of the liquid ejection device to solve the above problem includes flushing, which is ejection of the liquid not related to printing, from the plurality of nozzles is performed by a ejection amount based on a height difference of the plurality of nozzles.

DESCRIPTION OF EMBODIMENTS

First Embodiment

Figure 1:
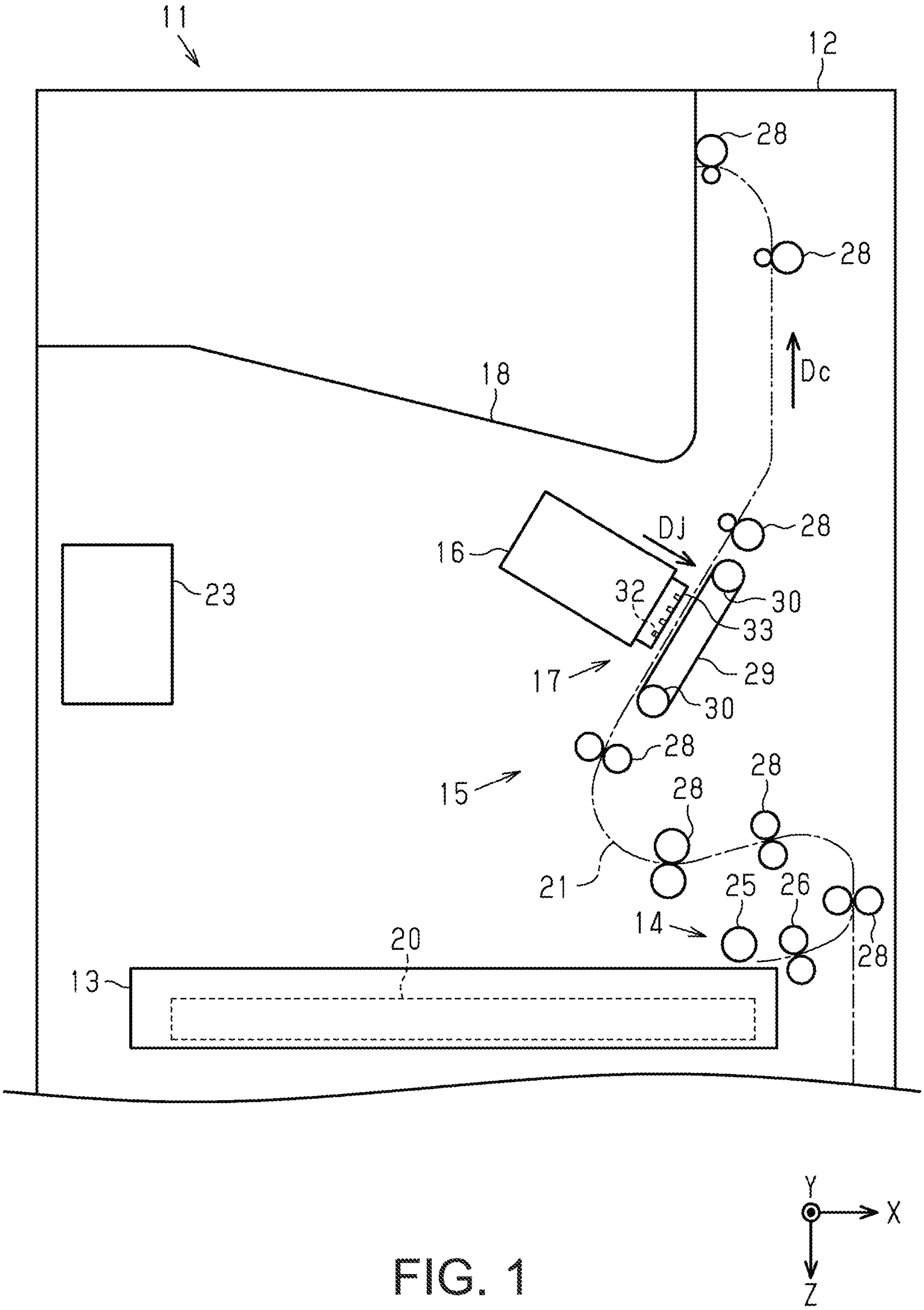
FIG. 1 is a schematic view of a first embodiment of a liquid ejection device.

Hereinafter, a first embodiment of a liquid ejection device and a control method of the liquid ejection device will be described with reference to the drawings. The liquid ejection device according to the present embodiment is, for example, an ink jet printer that performs printing by ejecting ink, which is an example of liquid, onto a medium such as paper sheet or the like.

In the drawings, assuming that the liquid ejection device 11 is placed on a horizontal plane, a direction of gravity is indicated by a Z axis, and directions along the horizontal plane are indicated by an X axis and a Y axis. The X axis, the Y axis, and the Z axis are orthogonal to each other. In the following description, a direction parallel to the Y axis is also referred to as a width direction Y, and a direction parallel to the Z axis is also referred to as a vertical direction Z.

Liquid Ejection Device

As shown in FIG. 1, the liquid ejection device 11 may include a housing 12, a cassette 13, a feeding section 14, a transport section 15, a holding section 16, a liquid ejection head 17, and a stacker 18. The liquid ejection device 11 may include a plurality of cassettes 13 and a plurality of feeding sections 14. In FIG. 1, a transport path 21 along which a medium 20 is transported is indicated by one dot chain line. The transport path 21 is a path coupling the cassette 13 and the stacker 18.

The liquid ejection device 11 includes a control section 23. The control section 23 controls various operations performed in the liquid ejection device 11. The control section 23 controls the liquid ejection head 17.

The control section 23 may be configured as a circuit including, α: one or more processors that execute various processes in accordance with a computer program; β: one or more dedicated hardware circuits that execute at least some of the various processes; or γ: a combination thereof. The hardware circuit is, for example, an application specific integrated circuit (ASIC). The processor includes a CPU and a memory that is a RAM and a ROM. The memory stores program code or instructions configured to cause the CPU to perform processes. The Memory, that is, a computer-readable medium, includes any readable medium that can be accessed by a general purpose or special purpose computer.

The housing 12 accommodates various components of the liquid ejection device 11.

The cassette 13 can accommodate the medium 20. The cassette 13 can be inserted into or pulled out from the housing 12. The cassette 13 may be capable of accommodating a plurality of media 20 in a stacked state.

The feeding section 14 feeds the medium 20 accommodated in the cassette 13 one by one from the cassette 13 to the transport path 21. The feeding section 14 may include a feed roller 25 and a separation section 26.

The feed roller 25 feeds the medium 20 to the transport path 21 by rotating in contact with the medium 20. The feed roller 25 feeds the uppermost medium 20 among the media 20 accommodated in the cassette 13. The separation section 26 separates the media 20, which are fed in a stacked state, one by one. The separation section 26 holds the second and subsequent media 20 from the top in the cassette 13.

The transport section 15 transports the medium 20 fed by the feeding section 14 along the transport path 21. The transport section 15 transports the medium 20 in the transport direction Dc. The transport direction Dc is a direction along the transport path 21. The transport direction Dc is the direction from the cassette 13 toward the stacker 18. The transport section 15 may include one or more transport rollers 28, an endless transport belt 29, and a pair of pulleys 30.

The transport roller 28 transports the medium 20 along the transport path 21 by rotating in a state of sandwiching the medium 20. The transport roller 28 discharges the printed medium 20 to the stacker 18. The stacker 18 receives the medium 20 transported by the transport section 15.

The transport belt 29 is wound around the pair of pulleys 30. The transport belt 29 faces the liquid ejection head 17 with the transport path 21 interposed therebetween. The transport belt 29 supports a part of the medium 20 in a flat state. The transport belt 29 may transport the medium 20 by rotating in a state of sucking the medium 20.

The holding section 16 holds the liquid ejection head 17.

Liquid Ejection Head

As shown in FIG. 1, the liquid ejection head 17 includes a nozzle surface 33 in which a plurality of nozzles 32 is open. The liquid ejection head 17 of the present embodiment is a line head extending in the width direction Y. The liquid ejection head 17 performs printing by ejecting liquid from the plurality of nozzles 32 onto the medium 20 which is transported. The liquid ejection head 17 of the present embodiment performs printing by ejecting liquid onto the medium 20 which is transported in a stopped state. The liquid ejection head 17 performs printing by ejecting liquid in the width direction Y onto the medium 20 supported by the transport belt 29. The liquid ejected by the liquid ejection head 17 contains a pigment component.

The liquid ejection head 17 includes the plurality of nozzles 32, and an actuator (not illustrated), a pressure chamber (not illustrated), a vibration plate (not illustrated), and the like, corresponding to each of the nozzles 32. The plurality of nozzles 32 communicate with individual pressure chambers, respectively. The control section 23 applies a drive voltage to the actuator to vibrate the corresponding vibration plate, thereby ejecting the liquid (for example, ink) in the pressure chamber from the nozzle 32. The control section 23 can change the ejection amount of the liquid in each of the plurality of nozzles 32 by changing the driving voltage.

The liquid ejection head 17 is provided such that the nozzle surface 33 is inclined with respect to the horizontal plane. The liquid ejection head 17 ejects liquid in the ejection direction Dj. The ejection direction Dj may be a direction perpendicular to the nozzle surface 33 and intersect with the vertical direction Z.

Figure 2:
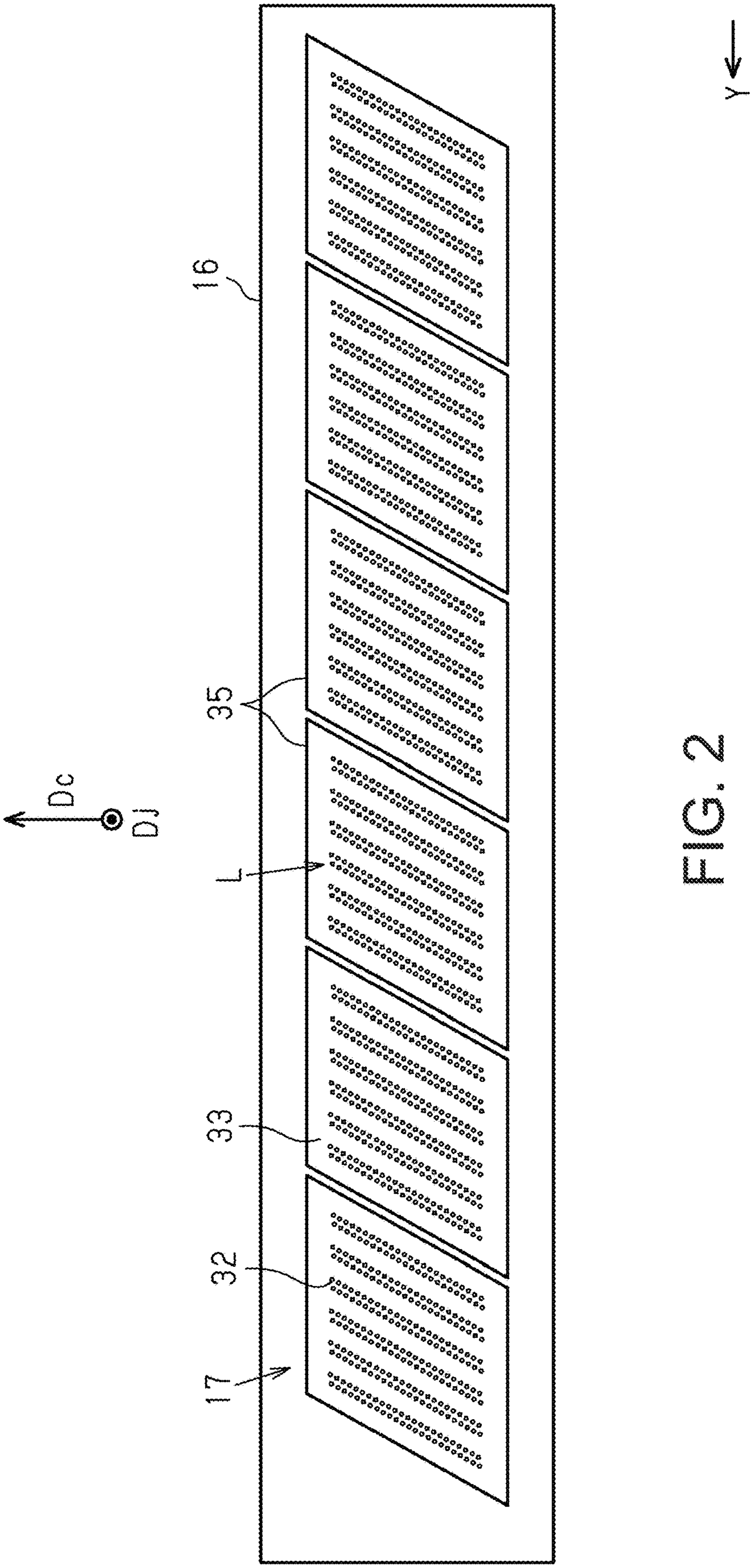
FIG. 2 is a schematic view of the liquid ejection head.

As shown in FIG. 2, the liquid ejection head 17 is provided with a nozzle row L. The nozzle row L is configured by arranging a plurality of nozzles 32 in parallel. The plurality of nozzles 32 constituting one nozzle row L is arranged in a direction oblique to the transport direction Dc and the width direction Y. The liquid ejection head 17 may include a plurality of nozzle rows L. In each of the nozzle rows L, the nozzles 32 located downstream in the transport direction Dc are located above the nozzles 32 located upstream in the transport direction Dc in the vertical direction Z.

The liquid ejection head 17 may include a plurality of units of the assembly heads 35. The plurality of units of the assembly heads 35 is arranged in the width direction Y. The plurality of units of the assembly heads 35 has the same configuration. Therefore, in the following description, one unit of the assembly heads 35 will be described.

Figure 3:
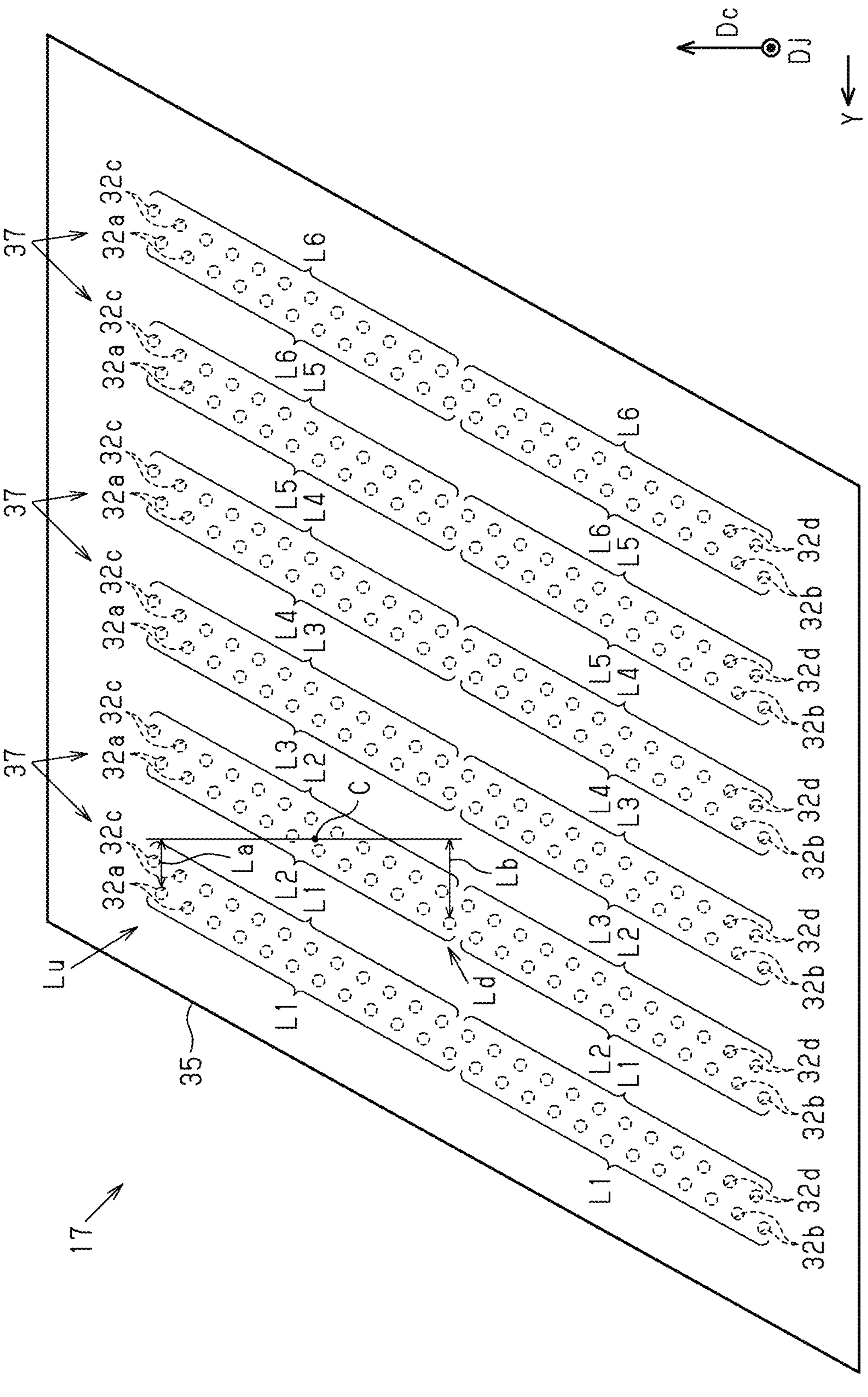
FIG. 3 is a schematic view of a unit of the assembly heads included in the liquid ejection head.

As shown in FIG. 3, the unit of the assembly heads 35 may have a plurality of nozzle groups 37. The unit of the assembly heads 35 of the present embodiment has six nozzle groups 37 arranged in the width direction Y. Each nozzle group 37 of the present embodiment has four nozzle rows L. In the present embodiment, the nozzle rows L of the six nozzle groups 37 are also referred to as a first nozzle row L1 to a sixth nozzle row L6, respectively.

One nozzle row L is constituted by the plurality of nozzles 32 that ejects the same type of liquid. Each nozzle group 37 may include a plurality of first nozzles **32*a* to a plurality of fourth nozzles 32*d* that eject different types of liquids. For example, the first nozzle 32*a* may eject cyan ink. The second nozzle 32*b* may eject yellow ink. The third nozzle 32*c* may eject magenta ink. The fourth nozzle 32*d*** may eject black ink.

The plurality of nozzles 32 that eject the same type of liquid may constitute a plurality of nozzle rows L. In the present embodiment, the plurality of nozzles 32 that eject the same type of liquid constitutes the first nozzle row L1 to the sixth nozzle row L6.

The plurality of nozzle rows L that eject the same type of liquid is arranged in the width direction Y. That is, the second nozzle row L2 is aligned with the first nozzle row L1 in the widthwise direction Y and ejects the same type of liquid as the first nozzle row L1.

Among the plurality of nozzle rows L that ejects the same type of liquid, adjacent nozzle rows L overlap in the transport direction Dc. That is, one or more first nozzles **32*a* constituting the highest portion Lu of the first nozzle row L1 and one or more first nozzles 32*a* constituting the lowest portion Ld of the second nozzle rows L2** are provided so as to overlap in the transport direction Dc.

Specifically, a first distance La is shorter than a second distance Lb. The first distance La is a distance in the widthwise direction Y from the highest first nozzle **32*a* of the first nozzle row L1 to the center C of the second nozzle row L2. The second distance Lb is a distance in the widthwise direction Y from the lowest first nozzle 32*a* of the second nozzle row L2** to the center C.

The plurality of nozzle rows L has the same configuration. Therefore, in the following description, one nozzle row L will be described.

Figure 4:
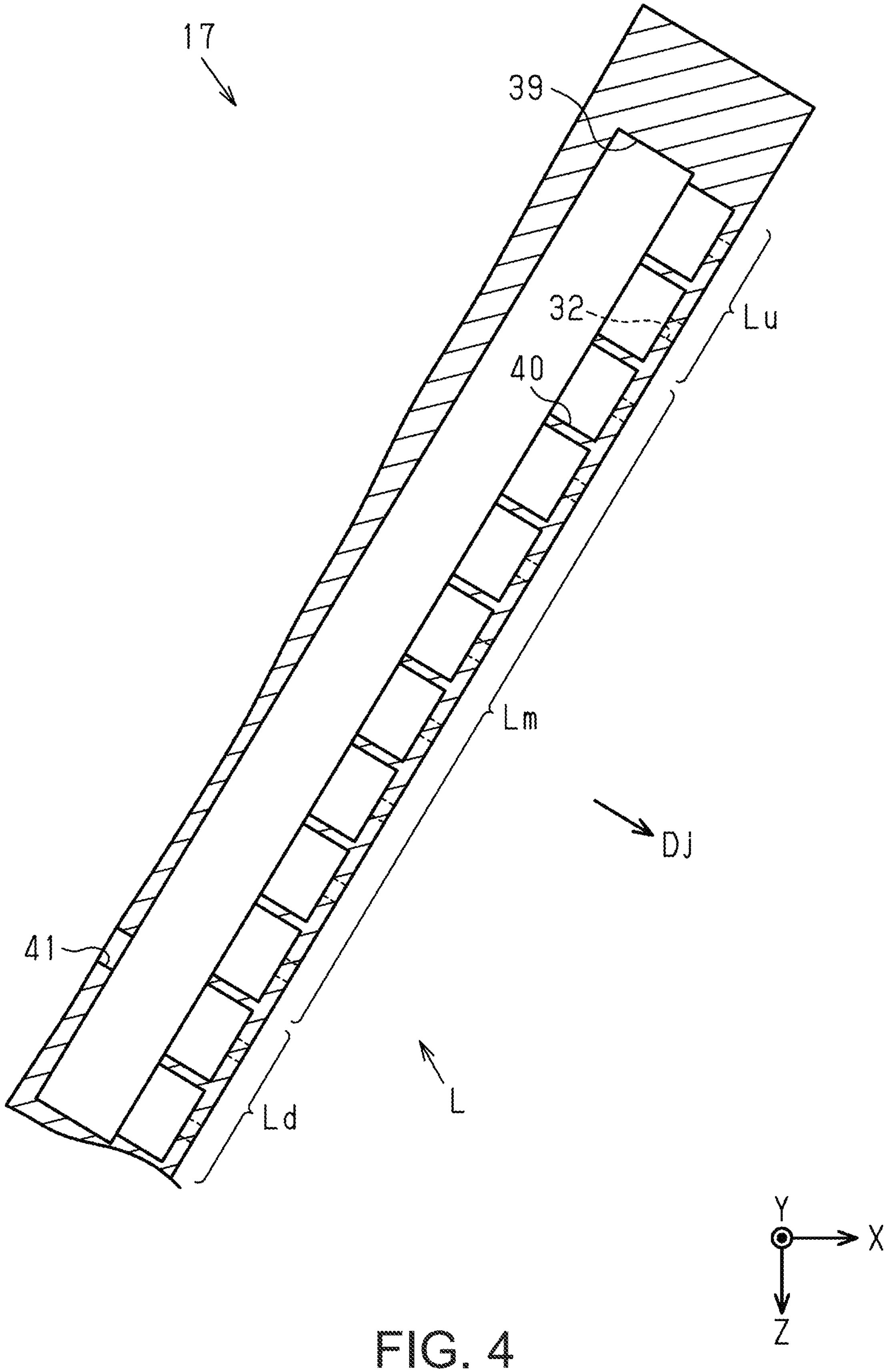
FIG. 4 is a partial cross-sectional view of the liquid ejection head.

As shown in FIG. 4, the liquid ejection head 17 may include a plurality of common liquid chambers 39 and a plurality of cavities 40. A common liquid chamber 39 is provided corresponding to one nozzle row L. The common liquid chamber 39 has an inlet port 41 through which the liquid is introduced.

The common liquid chamber 39 temporarily stores the liquid introduced from the inlet port 41. The plurality of cavities 40 is provided to individually correspond to the plurality of nozzles 32. The cavity 40 sends the liquid stored in the common liquid chamber 39 to the corresponding nozzle 32.

For example, the control section 23 may divide the plurality of nozzles 32 constituting the nozzle row L into a plurality of blocks and perform flushing with setting the ejection amount for each block. For example, the control section 23 may divide the plurality of nozzles 32 constituting the nozzle row L into three blocks of the highest portion Lu, the middle portion Lm, and the lowest portion Ld.

The control section 23 may set a portion constituted by a certain number of nozzles 32 positioned at the center of the nozzle row L as the middle portion Lm. The control section 23 may set a portion located above the middle portion Lm in the vertical direction Z as the highest portion Lu. The control section 23 may set a portion located below the middle portion Lm in the vertical direction Z as the lowest portion Ld. The control section 23 may set a portion below the inlet port 41 as the lowest portion Ld. The number of the nozzles 32 constituting the highest portion Lu may be the same level as or different from the number of the nozzles 32 constituting the lowest portion Ld.

The control section 23 may set the ejection amount in the case of performing flushing for each nozzle 32 or for each block. For example, in a case where flushing is performed, the control section 23 may cause the liquid of the first ejection amount to be ejected from the nozzles 32 of the highest portion Lu. In a case where flushing is performed, the control section 23 may cause the liquid of the second ejection amount to be ejected from the nozzles 32 of the middle portion Lm. In a case where flushing is performed, the control section 23 may cause the liquid of the third ejection amount to be ejected from the nozzles 32 of the lowest portion Ld.

The first ejection amount may be an amount ejected from one nozzle 32 or may be a total amount ejected from a plurality of nozzles 32 constituting the highest portion Lu. Similarly, the second ejection amount may be an amount ejected from one nozzle 32 or may be a total amount ejected from a plurality of nozzles 32 constituting the middle portion Lm. The third ejection amount may be an amount ejected from one nozzle 32 or may be a total amount ejected from a plurality of nozzles 32 constituting the lowest portion Ld.

The control section 23 may change at least one of the first ejection amount, the second ejection amount, and the third ejection amount according to the ejection condition.

Specifically, the control section 23 may set the first ejection amount to be larger than each of the second ejection amount and the third ejection amount. The control section 23 may perform flushing by setting the ejection amount from one or more nozzles 32 constituting the highest portion Lu of the nozzle row L among the plurality of nozzles 32 constituting the nozzle row L to be larger than the ejection amount from the other plurality of nozzles 32.

For example, in an initial state in which the degree of sedimentation of the liquid in the common liquid chamber 39 is low, a change in concentration with respect to a state in which the liquid is not sedimented is larger in the upper portion than in the lower portion. That is, in the initial state, the influence of the liquid ejected from the nozzles 32 of the highest portion Lu on the image quality is larger than the influence of the liquid ejected from the nozzles 32 of the lowest portion Ld on the image quality. Therefore, by increasing the first ejection amount ejected from the highest portion Lu, flushing can be efficiently performed.

The control section 23 may set the third ejection amount to be larger than each of the first ejection amount and the second ejection amount. The control section 23 may perform flushing by setting the ejection amount from one or more nozzles 32 constituting the lowest portion Ld of the nozzle row L among the plurality of nozzles 32 constituting the nozzle row L to be larger than the ejection amount from the other plurality of nozzles 32.

The control section 23 may set the first ejection amount to be larger than the second ejection amount. The control section 23 may set the third ejection amount to be larger than each of the first ejection amount and the second ejection amount. The control section 23 may perform flushing by setting the ejection amount from one or more nozzles 32 constituting the highest portion Lu of the nozzle row L and one or more nozzles 32 constituting the lowest portion Ld of the nozzle row L among the plurality of nozzles 32 constituting the nozzle row L to be larger than the ejection amount from one or more nozzles 32 other than those. The control section 23 may perform flushing by reducing the ejection amount from one or more nozzles 32 constituting the lowest portion Ld of the nozzle row L, the ejection amount from one or more nozzles 32 constituting the highest portion Lu of the nozzle row L, and the ejection amount from one or more nozzles 32 other than those in this order.

When the sedimentation of the liquid in the common liquid chamber 39 progresses, the influence of the liquid ejected from the nozzles 32 at the lowest portion Ld on the image quality becomes larger than the influence of the liquid ejected from the nozzles 32 at the highest portion Lu on the image quality. At this time, the concentration of the liquid ejected from the nozzles 32 of the middle portion Lm is close to a state in which the liquid is not sedimented. Therefore, flushing can be efficiently performed by increasing the third ejection amount ejected from the lowest portion Ld and decreasing the second ejection amount ejected from the middle portion Lm.

The longer time that the liquid in the common liquid chamber 39 is left without being ejected, the greater the degree of sedimentation. The control section 23 may be configured to measure a non-ejection time period during which the liquid is not ejected from the liquid ejection head 17. The non-ejection time period may be a time elapsed without the liquid being introduced into the common liquid chamber 39. The non-ejection time period may be a time from when the previous printing is performed to when the next printing is performed. In a case where the non-ejection time period until printing is performed is a first time period, the control section 23 may increase the ejection amount in flushing compared to a case where the non-ejection time period until printing is performed is a second time period, which is shorter than the first time period.

Since the viscosity of the liquid decreases as the temperature increases, sedimentation is likely to occur. The control section 23 may be configured to measure the temperature of the liquid. The control section 23 may indirectly measure the temperature of the liquid by measuring, for example, the temperature of the liquid ejection head 17, the room temperature of the environment in which the liquid ejection device 11 is installed, or the like. In a case where the temperature of the liquid is a first temperature, the control section 23 may increase the ejection amount in flushing compared to a case where the temperature of the liquid is a second temperature lower than the first temperature.

When the ejection amount is increased, the control section 23 may increase at least one of the first ejection amount, the second ejection amount, and the third ejection amount, or may increase the total amount of the first ejection amount, the second ejection amount, and the third ejection amount.

Action of First Embodiment

The action of the present embodiment will be described.

In the liquid containing the pigment component, the pigment component may be sedimented in the common liquid chamber 39. When the sedimentation occurs, the concentration of the liquid gradually changes in the common liquid chamber 39. That is, in the common liquid chamber 39, the concentration of the lower portion is high and the concentration of the upper portion is low. The nozzles 32 at the lowest portion Ld eject liquid containing a large amount of pigment component, and the nozzles 32 at the highest portion Lu eject liquid containing a small amount of pigment component. When printing is performed in this state, the color tone of the portion printed by the nozzles 32 in the lowest portion Ld and the color tone of the portion printed by the nozzles 32 in the highest portion Lu are different.

Therefore, the control section 23 executes to eject the liquid from the liquid ejection head 17 by performing flushing before performing printing or the like. The control section 23 performs flushing which is ejection of liquid which is not related to printing from the plurality of nozzles 32 with a ejection amount based on the height difference of the plurality of nozzles 32.

The plurality of nozzle rows L that discharge the same type of liquid overlaps in the transport direction Dc, each other. In a case where printing is performed on the medium 20, the highest portion Lu of the first nozzle row LI ejects liquid to overlap the portion printed by the lowest portion Ld of the second nozzle row L2. The control section 23 can cause the color tone of the liquid to approach the color tone of the liquid ejected by the nozzles 32 of the middle portion Lm by ejecting the thick liquid ejected by the nozzles 32 of the lowest portion Ld and the thin liquid ejected by the nozzles 32 of the highest portion Lu in an overlapping manner.

Effects of First Embodiment

Effects of the present embodiment will be described.

1-1: The control section 23 executes ejecting the liquid to be ejected from the plurality of nozzles 32 by the ejection amount based on the height difference of the plurality of nozzles 32. The height difference of the nozzle 32 affects the degree of sedimentation. Therefore, it is possible to perform flushing with a ejection amount corresponding to the degree of sedimentation. Therefore, it is possible to suppress the influence of the sedimentation on the image quality while reducing the consumption amount of the liquid.

1-2: The control section 23 increases the ejection amount from one or more nozzles 32 constituting the lowest portion Ld among the plurality of nozzles 32 constituting the nozzle row L. For this reason, it is possible to eject a large amount of liquid having a high concentration among the liquid in which the concentration is biased due to the sedimentation. Therefore, it is possible to efficiently suppress the influence of sedimentation on image quality.

1-3: The control section 23 increases the ejection amount from one or more nozzles 32 constituting the highest portion Lu among the plurality of nozzles 32 constituting the nozzle row L. For this reason, it is possible to eject a large amount of liquid having a low concentration among the liquid in which the concentration is biased due to the sedimentation. Therefore, it is possible to efficiently suppress the influence of sedimentation on image quality.

1-4: The control section 23 increases the ejection amount from one or more nozzles 32 constituting the highest portion Lu and one or more nozzles 32 constituting the lowest portion Ld among the plurality of nozzles 32 constituting the nozzle row L. For this reason, it is possible to eject a large amount of liquid having a low concentration and a large amount of liquid having a high concentration among the liquids in which the concentration is biased due to sedimentation. Therefore, it is possible to efficiently suppress the influence of sedimentation on image quality.

1-5: The control section 23 increases the ejection amount from one or more nozzles 32 constituting the lowest portion Ld among the plurality of nozzles 32 constituting the nozzle row L. Then, the control section 23 increases the ejection amount from one or more nozzles 32 constituting the highest portion Lu among the plurality of nozzles 32 constituting the nozzle row L. Therefore, it is possible to eject a large amount of the liquid having a high concentration and the liquid having a low concentration among the liquids in which the concentration is biased due to the sedimentation. Therefore, it is possible to efficiently suppress the influence of sedimentation on image quality.

1-6: When the non-ejection time period is long, the control section 23 increases the ejection amount in flushing compared to when the non-ejection time period is short. Since the sedimentation progresses with the passage of time, flushing can be performed with a ejection amount corresponding to the degree of the sedimentation.

1-7: The highest portion Lu of the first nozzle row L1 and the lowest portion Ld of the second nozzle row L2 overlap in the transport direction Dc. Therefore, because the liquid ejected from the nozzles 32 of the highest portion Lu and the liquid ejected from the nozzles 32 of the lowest portion Ld can be printed in an overlapping manner, the influence of the sedimentation on the image quality can be suppressed.

1-8: The liquid ejection head 17 is a line head. The line head has more nozzle rows L than, for example, a serial head. Therefore, it is possible to more effectively reduce the consumption amount of the liquid.

1-9: The inlet port 41 is provided at a position below the center of the common liquid chamber 39. Therefore, it is possible to stir the sedimented liquid in the common liquid chamber 39 by the liquid which is introduced from the inlet port 41. Therefore, it is possible to reduce the amount of liquid which is discharged by flushing.

Second Embodiment

Next, a liquid ejection device and a control method of liquid ejection device according to a second embodiment will be described with reference to the drawings. The second embodiment is different from the first embodiment in that the liquid ejection head is movably provided. In other respects, the second embodiment is substantially the same as the first embodiment, so the same components are denoted by the same reference numerals, and redundant description thereof will be omitted.

The liquid ejection head 17 of the present embodiment is a serial head which can reciprocate in the width direction Y. The liquid ejection device 11 performs printing by alternately performing transport of the medium 20 and movement of the liquid ejection head 17. The liquid ejection head 17 performs printing on the medium 20 by ejecting liquid while reciprocating in the width direction Y. As in the first embodiment, the liquid ejection head 17 is provided such that the nozzle surface 33 is inclined with respect to the horizontal plane.

Figure 5:
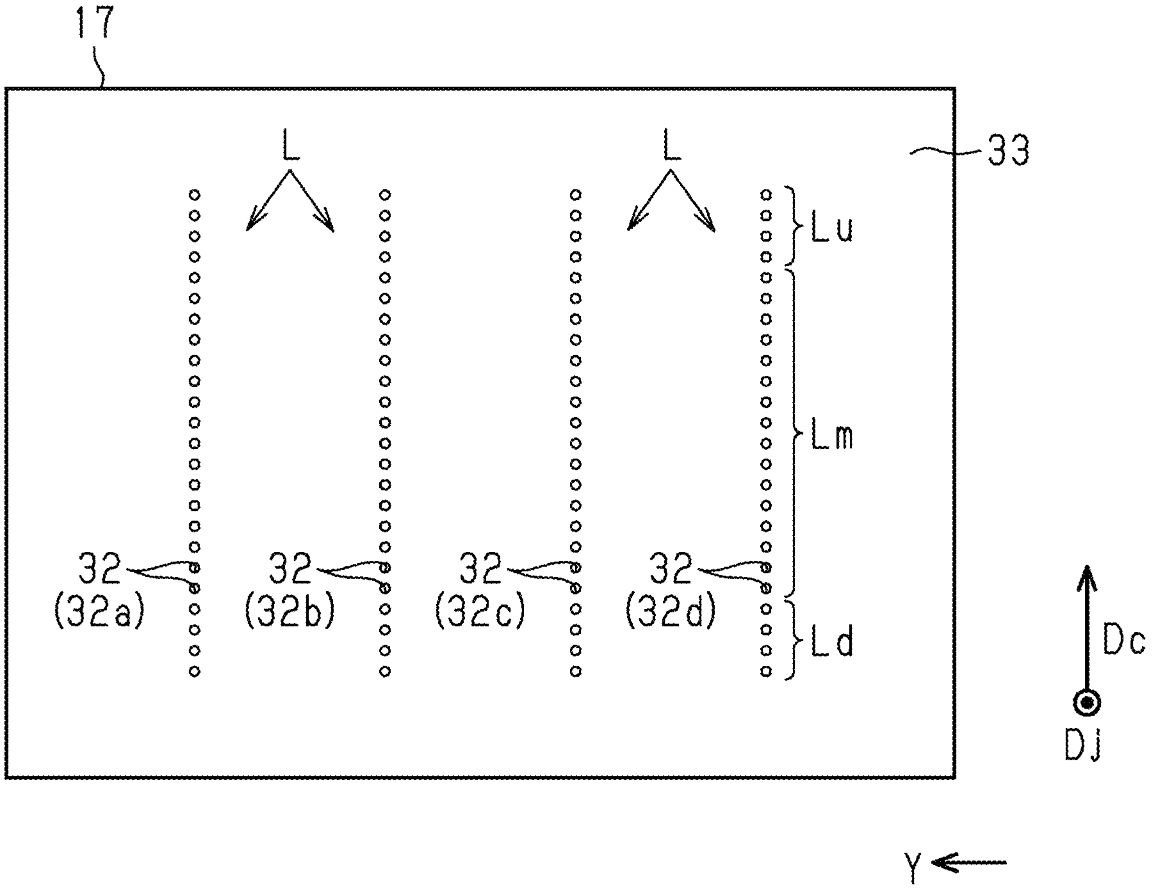
FIG. 5 is a schematic view of a second embodiment of the liquid ejection head.

As shown in FIG. 5, the liquid ejection head 17 of the embodiment has a nozzle row L which is configured by a plurality of nozzles 32 which is arranged in the transport direction Dc. The liquid ejection head 17 may include a plurality of nozzle rows L arranged in the width direction Y. The plurality of nozzle rows L may be constituted by first nozzles 32*a* to fourth nozzles 32*d* that ejects different types of liquids. One nozzle row L may be constituted by a plurality of nozzles 32 that ejects the same type of liquid.

In each of the nozzle rows L, the nozzles 32 located downstream in the transport direction Dc are located above the nozzles 32 located upstream in the transport direction Dc in the vertical direction Z. The control section 23 performs flushing with a ejection amount based on the height difference of the plurality of nozzles 32. Because the control section 23 performs flushing in each nozzle row L in the same manner as in the first embodiment, the description thereof will be omitted.

Modifications

The present embodiment can be implemented with the following modifications. The present embodiment and the following modifications can be implemented in combination with each other as long as there is no technical contradiction.

- The inlet port 41 may be provided at the center of the common liquid chamber 39 in the vertical direction Z, or may be provided at a position above the center of the common liquid chamber 39.
- The control section 23 may set the ejection amount from the nozzle 32 located at a position distant from the inlet port 41 to be larger than the ejection amount from the nozzle 32 located at a position close to the inlet port 41. As a result, the liquid in the common liquid chamber 39 can easily flow. For example, in a case where the inlet port 41 is positioned at the center of the common liquid chamber 39, the control section may set the first ejection amount and the second ejection amount to be larger than the third ejection amount. In a case where the inlet port 41 is positioned below the center of the common liquid chamber 39, the control section 23 may set the first ejection amount to be larger than each of the second ejection amount and the third ejection amount.
- The control section 23 may shift the timing of ejecting the liquid in the highest portion Lu, the middle portion Lm, and the lowest portion Ld. For example, the control section 23 may set the timing at which the liquid is ejected from the nozzle 32 located at a position distant from the inlet port 41 to be earlier than the timing at which the liquid is ejected from the nozzle 32 located at a position close to the inlet port 41. Specifically, in a case where the inlet port 41 is positioned on the lower side, the control section 23 may cause the liquid to be ejected first from the nozzle 32 of the highest portion Lu and then cause the liquid to be ejected from the nozzle 32 of the lowest portion Ld. When the liquid is ejected first from the nozzle 32 of the highest portion Lu, it is possible to cause the liquid having a high concentration which is sedimented in the common liquid chamber 39 to flow to be swirled up. That is, the liquid in the common liquid chamber 39 can be stirred.
- The control section 23 may perform flushing by ejecting the liquid from one or more nozzles 32 constituting the highest portion Lu or the lowest portion Ld. The control section may perform flushing by ejecting the liquid from one or more nozzles 32 constituting the highest portion Lu and one or more nozzles 32 constituting the lowest portion Ld. In a case where flushing is performed, the control section 23 may not execute the plurality of nozzles 32 constituting the middle portion Lm to eject the liquid. The second ejection amount may be zero.
- The control section 23, for example, may change the ejection amount in accordance with the type of liquid. The control section 23 may increase the ejection amount in the nozzle row L which discharges the liquid, which is easily sedimented, compared to the nozzle row L which ejects the liquid which is not easily sedimented.
- The liquid ejection head 17 may be configured to eject a liquid containing a pigment component and a liquid not containing a pigment component. In this case, the control section 23 may perform flushing with the ejection amount based on the height difference of the nozzles 32 in the nozzle row L which ejects the liquid containing the pigment component. Further, in this case, the control section 23 may perform flushing of the same amount from all the nozzles without performing flushing of the ejection amount based on the height difference of the nozzles 32 in the nozzle row L which ejects the liquid which does not include the pigment component.
- Even in a case where the first ejection amount is larger than each of the second ejection amount and the third ejection amount, the control section 23 may change the ejection amount according to the non-ejection time period, the temperature of the liquid, or the like.
- The ejection amount ejected from the plurality of nozzles 32 by flushing may be unchanged. The control section 23 may cause the liquid to be ejected in a preset ejection amount regardless of the non-ejection time period, the temperature of the liquid, the timing at which flushing is performed, or the like.
- The liquid ejection device 11 may be a liquid ejection device that ejects or discharges liquid other than ink. The state of the liquid which is ejected from the liquid ejection device in the form of a minute amount of liquid droplets includes a granular shape, a tear shape, and a shape with a thread-like tail. Here, the liquid may be a material which can be ejected from the liquid ejection device. For example, the liquid may be in a state where a substance is in a liquid phase and may include a fluid body such as a liquid body having high or low viscosity, a sol, gel water, other inorganic solvents, an organic solvent, a solution, a liquid resin, a liquid metal, and a metal melt. The liquid includes not only a liquid as one state of a substance but also a liquid in which particles of a functional material made of a solid material such as a pigment or metal particles are dissolved, dispersed, or mixed in a solvent. Typical examples of the liquid include ink and liquid crystal as described in the above embodiment. Here, the ink includes various liquid compositions such as general water-based ink, oil-based ink, gel ink, and hot-melt ink. As a specific example of the liquid ejection device, for example, there is an apparatus that ejects a liquid containing a material such as an electrode material or a color material used for manufacturing a liquid crystal display, an electroluminescence display, a surface emitting display, a color filter, or the like in a dispersed or dissolved form. The liquid ejection device may be an apparatus that ejects a bio-organic substance used for manufacturing a biochip, an apparatus that is used as a precision pipette and that ejects a liquid serving as a sample, a textile printing apparatus, a micro dispenser, or the like. The liquid ejection device may be an apparatus that discharges lubricating oil in a pinpoint manner to a precision machine such as a watch or a camera, or an apparatus that discharges a transparent resin liquid such as an ultraviolet curable resin onto a substrate in order to form a micro hemispherical lens, an optical lens, or the like used in an optical communication element or the like. The liquid ejection device may be an apparatus that discharges an etchant such as an acid or an alkali for etching a substrate or the like.

Definitions

As used herein, the phrase "at least one" means "one or more" of the desired alternatives. As an example, the phrase "at least one" as used herein means "only one option" or "both of two options" if the number of options is two. As another example, as used herein, the phrase "at least one" means "only one option", "a combination of two options", or "a combination of three or more options" if the number of options is three or more.

Notes

Hereinafter, technical ideas grasped from the above-described embodiment and modifications, and operations and effects thereof will be described.

(A) A liquid ejection device includes a liquid ejection head that performs printing by ejecting liquid from a plurality of nozzles in an ejection direction, which intersects a vertical direction, from a plurality of nozzles onto a transported medium and a control section configured to control the liquid ejection head, wherein the liquid includes a pigment component, the liquid ejection head is provided with a nozzle row in which a plurality of the nozzles is arranged in parallel, and the control section performs flushing, which is ejection of the liquid not related to printing, from the plurality of nozzles with an ejection amount based on a height difference of the plurality of nozzles.

According to this configuration, the control section executes ejecting the liquid from the plurality of nozzles by the ejection amount based on the height difference of the plurality of nozzles. The height difference of the nozzles influences the degree of sedimentation. Therefore, it is possible to perform flushing with a ejection amount corresponding to the degree of sedimentation. Therefore, it is possible to suppress the influence of the sedimentation on the image quality while reducing the consumption amount of the liquid.

(B) In the liquid ejection device, the control section may perform flushing by making the ejection amount from the one or more nozzles constituting a lowest portion of the nozzle row among the plurality of nozzles constituting the nozzle row to be larger than the ejection amount from the other plurality of nozzles.

According to this configuration, the control section increases the ejection amount from one or more nozzles constituting the lowest portion among the plurality of nozzles constituting the nozzle row. For this reason, it is possible to eject a large amount of liquid having a high concentration among the liquid in which the concentration is biased due to the sedimentation. Therefore, it is possible to efficiently suppress the influence of sedimentation on image quality.

(C) In the liquid ejection device, the control section may perform flushing by making the ejection amount from the one or more nozzles constituting a highest portion of the nozzle row among the plurality of nozzles constituting the nozzle row larger than the ejection amount from the other plurality of nozzles.

According to this configuration, the control section increases the ejection amount from one or more nozzles configuring the highest portion among the plurality of nozzles configuring the nozzle row. For this reason, it is possible to eject a large amount of liquid having a low concentration among the liquid in which the concentration is biased due to the sedimentation. Therefore, it is possible to efficiently suppress the influence of sedimentation on image quality.

(D) In the liquid ejection device, the control section may perform flushing by making the ejection amount from the one or more nozzles constituting the highest portion of the nozzle row and the one or more nozzles constituting the lowest portion of the nozzle row among the plurality of nozzles constituting the nozzle row larger than the ejection amount from the one or more other nozzles.

According to this configuration, the control section increases the ejection amount from one or more nozzles constituting the highest portion and one or more nozzles constituting the lowest portion among the plurality of nozzles constituting the nozzle row. For this reason, it is possible to eject a large amount of liquid having a low concentration and a large amount of liquid having a high concentration among the liquids in which the concentration is biased due to sedimentation. Therefore, it is possible to efficiently suppress the influence of sedimentation on image quality.

(E) In the liquid ejection device, the control section may perform flushing by reducing the ejection amount from the one or more nozzles constituting the lowest portion of the nozzle row, the ejection amount from the one or more nozzles constituting the highest portion of the nozzle row, and the ejection amount from the one or more other nozzles in this order.

According to this configuration, the control section increases the ejection amount from one or more nozzles constituting the lowest portion among the plurality of nozzles constituting the nozzle row. Then, the control section increases the ejection amount from one or more nozzles constituting the highest portion among the plurality of nozzles constituting the nozzle row. Therefore, it is possible to eject a large amount of the liquid having a high concentration and the liquid having a low concentration among the liquids in which the concentration is biased due to the sedimentation. Therefore, it is possible to efficiently suppress the influence of sedimentation on image quality.

(F) In the liquid ejection device, the control section is configured to measure a non-ejection time period during which the liquid is not ejected from the liquid ejection head, and when the non-ejection time period until the printing is performed is a first time period, the ejection amount in flushing may be set to be larger than when the non-ejection time period until the printing is performed is a second time period, which is shorter than the first time period.

According to this configuration, in a case where the non-ejection time period is long, the control section increases the ejection amount in flushing compared to a case where the non-ejection time period is short. Since the sedimentation progresses with the passage of time, flushing can be performed with a ejection amount corresponding to the degree of the sedimentation.

(G) In the liquid ejection device, the liquid ejection head has a second nozzle row that is the nozzle row placed alongside the first nozzle row in the width direction of the medium and ejects the same type of liquid as the first nozzle row, and one or more of the nozzles constituting an highest portion of the first nozzle row and one or more of the nozzles constituting a lowest portion of the second nozzle row may be provided to overlap in the transport direction.

According to this configuration, the highest portion of the first nozzle row and the lowest portion of the second nozzle row overlap each other in the transport direction. For this reason, because it is possible to perform printing by overlapping the liquid which is ejected by the nozzle of the highest portion and the liquid which is ejected by the nozzle of the lowest portion, it is possible to suppress the influence of sedimentation on the image quality.

(H) In the liquid ejection device, the liquid ejection head may be a line head extending in the width direction.

According to this configuration, the liquid ejection head is a line head. The line head has more nozzle rows than, for example, a serial head. Therefore, it is possible to more effectively reduce the consumption amount of the liquid.

(I) A control method of the liquid ejection device having a liquid ejection head that performs printing by ejecting liquid from a plurality of nozzles in an ejection direction, which intersects a vertical direction, from a plurality of nozzles onto a transported medium, the liquid having pigment component, and the liquid ejection head having a nozzle row configured by arranging a plurality of the nozzles in parallel, the control method of the liquid ejection device includes flushing, which is ejection of the liquid not related to printing, from the plurality of nozzles is performed by a ejection amount based on a height difference of the plurality of nozzles. According to this method, it is possible to achieve the same effects as those of the liquid ejection device.

(J) A control method of the liquid ejection device may include flushing performed by setting the ejection amount from one or more nozzles constituting a lowest portion of the nozzle row among the plurality of nozzles constituting the nozzle row to be larger than the ejection amount from the other plurality of nozzles. According to this method, it is possible to achieve the same effects as those of the liquid ejection device.

(K) The control method of the liquid ejection device may include flushing is performed by setting the ejection amount from one or more nozzles constituting a highest portion of the nozzle row among the plurality of nozzles constituting the nozzle row to be larger than the ejection amount from the other plurality of nozzles. According to this method, it is possible to achieve the same effects as those of the liquid ejection device.

(L) The control method of the liquid ejection device may include flushing is performed by setting the ejection amount from the one or more nozzles constituting a highest portion of the nozzle row among the plurality of nozzles constituting the nozzle row and the one or more nozzles constituting a lowest portion of the nozzle row among the plurality of nozzles constituting the nozzle row to be larger than the ejection amount from the other one or more nozzles. According to this method, it is possible to achieve the same effects as those of the liquid ejection device.

(M) The control method of the liquid ejection device may include flushing is performed by reducing the ejection amount from the one or more nozzles constituting the lowest portion of the nozzle row, the ejection amount from the one or more nozzles constituting the highest portion of the nozzle row, and the ejection amount from the one or more other nozzles in this order. According to this method, it is possible to achieve the same effects as those of the liquid ejection device.

(N) The control method of the liquid ejection device may include measuring a non-ejection time period during which the liquid is not ejected from the liquid ejection head and when the non-ejection time period until the printing is performed is a first time period, performing ejection with the ejection amount in flushing is set to be larger than when the non-ejection time period until the printing is performed is a second time period, which is shorter than the first time period. According to this method, it is possible to achieve the same effects as those of the liquid ejection device.

What is claimed is:

1. A liquid ejection device comprising:

a liquid ejection head that performs printing by ejecting liquid from a plurality of nozzles in an ejection direction, which intersects a vertical direction, with respect to a medium transported in a transport direction; and a control section configured to control the liquid ejection head, wherein the liquid includes a pigment component, the liquid ejection head is provided with a nozzle row in which the plurality of nozzles is arranged in parallel, the control section performs flushing, which is ejection of the liquid not related to the printing, from the plurality of nozzles with an ejection amount based on a height difference of the plurality of nozzles, and the height difference is associated with a specific relative position of each of the plurality of nozzles in the nozzle row in the vertical direction.

2. The liquid ejection device according to claim 1, wherein the control section performs the flushing by making the ejection amount from one or more nozzles constituting a lowest portion of the nozzle row among the plurality of nozzles constituting the nozzle row larger than the ejection amount from remaining nozzles of the plurality of nozzles.

3. The liquid ejection device according to claim 1, wherein the control section performs the flushing by making the ejection amount from one or more nozzles constituting a highest portion of the nozzle row among the plurality of nozzles constituting the nozzle row larger than the ejection amount from remaining nozzles of the plurality of nozzles.

4. The liquid ejection device according to claim 1, wherein the control section performs the flushing by making the ejection amount from one or more nozzles constituting a highest portion of the nozzle row and one or more nozzles constituting a lowest portion of the nozzle row among the plurality of nozzles constituting the nozzle row larger than the ejection amount from remaining nozzles of the plurality of nozzles.

5. The liquid ejection device according to claim 1, wherein the control section performs the flushing by reducing the ejection amount from one or more nozzles constituting a lowest portion of the nozzle row, the ejection amount from one or more nozzles constituting a highest portion of the nozzle row, and the ejection amount from remaining nozzles of the plurality of nozzles in this order.

6. The liquid ejection device according to claim 1, wherein the control section is configured to measure a non-ejection time period during which the liquid is not ejected from the liquid ejection head, and the ejection amount in the flushing is set to be larger when the non-ejection time period until the printing is performed is a first time period than when the non-ejection time period until the printing is performed is a second time period, which is shorter than the first time period.

7. The liquid ejection device according to claim 1, wherein the liquid ejection head includes a first nozzle row which is the nozzle row, and a second nozzle row that is placed alongside the first nozzle row in a width direction of the medium and that ejects the same type of liquid as the first nozzle row, and one or more nozzles of the plurality of nozzles constituting a highest portion of the first nozzle row and one or more nozzles of the plurality of nozzles constituting a lowest portion of the second nozzle row are provided to overlap in the transport direction.

8. The liquid ejection device according to claim 7, wherein the liquid ejection head is a line head extending in the width direction.

9. A control method of a liquid ejection device, the liquid ejection device including a liquid ejection head that performs printing by ejecting liquid in an ejection direction, which intersects a vertical direction, from a plurality of nozzles onto a transported medium, wherein the liquid includes a pigment component and the liquid ejection head is provided with a nozzle row configured by aligning the plurality of nozzles, the control method of the liquid ejection device comprising:

performing flushing, which is ejection of the liquid not related to the printing, from the plurality of nozzles by an ejection amount based on a height difference of the plurality of nozzles, wherein the height difference is associated with a specific relative position of each of the plurality of nozzles in the nozzle row in the vertical direction.

10. The control method of the liquid ejection device according to claim 9, wherein the flushing is performed by setting the ejection amount from one or more nozzles constituting a lowest portion of the nozzle row among the plurality of nozzles constituting the nozzle row to be larger than the ejection amount from remaining nozzles of the plurality of nozzles.

11. The control method of the liquid ejection device according to claim 9, wherein the flushing is performed by setting the ejection amount from one or more nozzles constituting a highest portion of the nozzle row among the plurality of nozzles constituting the nozzle row to be larger than the ejection amount from remaining nozzles of the plurality of nozzles.

12. The control method of the liquid ejection device according to claim 9, wherein the flushing is performed by setting the ejection amount from one or more nozzles constituting a highest portion of the nozzle row among the plurality of nozzles constituting the nozzle row and one or more nozzles constituting a lowest portion of the nozzle row among the plurality of nozzles constituting the nozzle row to be larger than the ejection amount from one or more remaining nozzles of the plurality of nozzles.

13. The control method of the liquid ejection device according to claim 9, wherein the flushing is performed by reducing the ejection amount from one or more nozzles constituting a lowest portion of the nozzle row, the ejection amount from one or more nozzles constituting a highest portion of the nozzle row, and the ejection amount from remaining nozzles of the plurality of nozzles in this order.

14. The control method of the liquid ejection device according to claim 9, further comprising:

measuring a non-ejection time period during which the liquid is not ejected from the liquid ejection head, and performing the ejection with the ejection amount in the flushing set to be larger when the non-ejection time period until the printing is performed is a first time period, than when the non-ejection time period until the printing is performed is a second time period, which is shorter than the first time period.

* * * * *